"(12) United States Patent
Chretien et al.

(10) Patent No.: US 8,657,430 B2
(45) Date of Patent: Feb. 25, 2014

(54) CURABLE PHASE CHANGE INKS CONTAINING CRYSTALLINE POLYESTERS

(75) Inventors: Michelle N. Chretien, Mississauga (CA); Bryan J. Roof, Newark, NY (US); Barkev Keoshkerian, Thornhill (CA); Naveen Chopra, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 448 days.

(21) Appl. No.: 12/900,887

(22) Filed: Oct. 8, 2010

(65) Prior Publication Data

US 2012/0086761 A1 Apr. 12, 2012

(51) Int. Cl.
 *C09D 11/00* (2006.01)
(52) U.S. Cl.
 USPC ............ 347/99; 347/88; 347/102; 106/31.29; 106/31.61
(58) Field of Classification Search
 USPC ................ 347/88, 99, 102; 106/31.29–31.31, 106/31.61–31.63, 31.13
 See application file for complete search history.

(56) References Cited

U.S. PATENT DOCUMENTS

| | | | |
|---|---|---|---|
| 5,231,135 A | 7/1993 | Machell et al. | |
| 5,621,022 A | 4/1997 | Jaeger et al. | |
| 6,221,137 B1 | 4/2001 | King et al. | |
| 6,336,963 B1 * | 1/2002 | Malhotra et al. | 106/31.29 |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,276,614 B2 | 10/2007 | Toma et al. | |
| 7,279,587 B2 | 10/2007 | Odell et al. | |
| 7,293,868 B2 * | 11/2007 | Odell et al. | 347/100 |
| 7,329,476 B2 | 2/2008 | Sacripante et al. | |
| 7,381,831 B1 | 6/2008 | Banning et al. | |
| 7,427,323 B1 | 9/2008 | Birau et al. | |
| 8,222,313 B2 * | 7/2012 | Iftime et al. | 522/75 |
| 8,349,970 B2 * | 1/2013 | Faucher et al. | 525/412 |
| 2006/0119686 A1 | 6/2006 | Odell | |
| 2006/0132570 A1 * | 6/2006 | Odell et al. | 347/102 |
| 2006/0144290 A1 * | 7/2006 | Polk et al. | 106/31.65 |
| 2006/0158496 A1 | 7/2006 | Odell et al. | |
| 2006/0216626 A1 | 9/2006 | Sacripante et al. | |
| 2007/0120921 A1 | 5/2007 | Carlini et al. | |
| 2007/0120924 A1 | 5/2007 | Odell et al. | |
| 2008/0000384 A1 * | 1/2008 | Belelie et al. | 106/31.13 |
| 2008/0107990 A1 | 5/2008 | Field et al. | |
| 2008/0122914 A1 | 5/2008 | Toma et al. | |
| 2008/0131176 A1 * | 6/2008 | Snyder | 399/321 |
| 2008/0236446 A1 | 10/2008 | Zhou et al. | |
| 2009/0047593 A1 | 2/2009 | Vanbesien et al. | |
| 2009/0104373 A1 * | 4/2009 | Vanbesien et al. | 427/553 |
| 2009/0155712 A1 * | 6/2009 | Sacripante et al. | 430/137.22 |
| 2009/0195572 A1 * | 8/2009 | Kovacs et al. | 347/7 |
| 2009/0297714 A1 * | 12/2009 | Wong et al. | 427/256 |
| 2010/0086683 A1 * | 4/2010 | Birau et al. | 427/256 |
| 2010/0086701 A1 | 4/2010 | Iftime et al. | |
| 2010/0101716 A1 | 4/2010 | Roof et al. | |
| 2010/0101717 A1 | 4/2010 | Roof | |
| 2010/0103235 A1 | 4/2010 | Roof et al. | |

FOREIGN PATENT DOCUMENTS

CA 2 608 804 A1 5/2008
CA 2 608 820 A1 5/2008

OTHER PUBLICATIONS

Canadian Office Action dated Dec. 10, 2012 from Canadian Patent Application No. 2,754,310.
U.S. Appl. No. 12/544,031, filed Aug. 19, 2009.
U.S. Appl. No. 11/625,472, filed Nov. 24, 2009.
U.S. Appl. No. 12/814,741, filed Jun. 14, 2010.
U.S. Appl. No. 12/474,946, filed May 29, 2009.
Kirk-Othmer, ""Encyclopedia of Chemical Techndogy,"" Fourth Edition, vol. 8, pp. 223-237, 1993.
Canadian Office Action dated Oct. 29, 2013 from Canadian Patent Application No. 2,754,310.

\* cited by examiner

*Primary Examiner* — Matthew Luu
*Assistant Examiner* — Rut Patel
(74) *Attorney, Agent, or Firm* — Oliff & Berridge, PLC

(57) ABSTRACT

This disclosure is generally directed to curable phase change inks, such as radiation-curable phase change inks, and their use in forming images, such as through inkjet printing. More specifically, this disclosure is directed to radiation-curable phase change inks, such as ultraviolet-light-curable phase change inks, that an ink vehicle and at least one crystalline polyester resin.

20 Claims, No Drawings"

CURABLE PHASE CHANGE INKS CONTAINING CRYSTALLINE POLYESTERS

BACKGROUND

This disclosure is generally directed to curable phase change inks, such as radiation-curable phase change inks, and their use in forming images, such as through inkjet printing. More specifically, this disclosure is directed to radiation-curable phase change inks, such as ultraviolet-light-curable phase change inks, that comprise a curable gellant and a crystalline polyester resin.

Inkjet printing systems are known in the art, and thus extensive description of such devices is not required herein. Phase change or "hot melt" inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, plastic, cardboard, and the like), the droplets solidify quickly upon contact with the substrate, so that migration of ink along the printing medium is substantially prevented and dot quality is improved.

While phase change inks enable more facile image printing and printing onto porous substrates, these inks may exhibit microbanding. Microbanding is an uneven distribution of ink in an image area in which the image should be smooth and uniform. Because the ink temperature drops after ejection, the ink freezes (or gels) quickly upon contact with the substrate and an uneven distribution of ink on the image substrate may occur. The human eye can sometimes observe the uneven distribution as bands or lines in the direction of the substrate travel past the print head.

Microbanding may be addressed by leveling the ink on the image substrate by contact leveling. As used herein, the phrase "contact leveling" is a processing technique that employs a contact member, such as a roller, belt, press, wiper, to provide a sufficient amount of pressure to the ink surface in an effort to normalize or smooth the ink distribution. A heating element may be located near or within the contact member to heat it and consequently soften the ink for the leveling operation. Examples of contact leveling techniques include those described in U.S. Patent Application Pub. No. 2010/0103235, U.S. Patent Application Pub. No. 2010/0101716 and U.S. Patent Application Pub. No. 2010/0101717, each of which is incorporated by reference in their entirety. Additional examples of contact level techniques and apparatuses included those described in U.S. patent application Ser. No. 12/544,031, U.S. patent application Ser. No. 12/625,472 and U.S. patent application Ser. No. 12/814,741, incorporated herein by reference in their entirety.

However, contact leveling the phase change ink is also subject to issues. For example, contact leveling the ink via contact member may cause the ink layer to split. A portion of the phase change ink may thus be transferred to the contact member and affect the print quality of later processed images. For example, a portion of the ink transferred from a contact member may later be deposited on subsequent media contacted by the contact member to leave a ghost of the previously leveled image. Further, ink build up on a contact member necessitates either replacement of the contact member or removal of the ink from the contact member on a periodic basis. Consequently, addressing the microbanding defect of a phase change ink in an image without splitting the ink or accumulating ink on a contact member would be useful. While use of a release fluid in the contact leveling procedure may reduce ink splitting and transfer, elimination of the use of release fluids by design of inks that are less prone to splitting and offset may also be useful.

SUMMARY

The curable phase change inks and process herein, addresses one or more of the above issues. The curable phase change ink composition containing an ink vehicle and at least one crystalline polyester resin, and the use of such inks in methods for forming images, particularly their use in inkjet printing.

In embodiments, disclosed herein is an ink composition comprising an ink vehicle and at least one crystalline polyester resin.

In embodiments, disclosed herein is an ink printing device comprising: a curable phase change ink composition for printing onto a substrate, an ink jetting device, a contact leveling member or roller, an optional intermediate transfer member, and a curing device which cures the jetted curable ink, wherein the ink composition comprises an ink vehicle and a crystalline polyester resin.

In embodiments, disclosed herein is a curable phase change ink composition, the ink composition comprising an ink vehicle and at least one crystalline polyester resin, wherein the at least one crystalline polyester resin has a weight average molecular weight ($M_w$) of from about 10,000 Dalton (Da) to about 60,000 Da, a number average molecular weight ($M_n$) of from about 5,000 Da to about 12,000 Da and a polydispersity of from about 2.0 to about 5.0, wherein the ink composition has elastic modulus (G') of from about 3000 Pa to about 4000 Pa, and a viscosity of about $10^4$ mPa·s to about $10^{6.5}$ mPa·s at a gelling temperature of about 25° C. to about 35° C., and wherein the ink composition has a viscosity of from about 3 to about 15 mPa·s at a jetting temperature of from about 60° C. to about 100° C.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "long-chain" refers, for example, to hydrocarbon chains $(CH_2)_n$, in which n represents the number of carbon atoms in the chain and wherein n is a number of from about 8 to about 60, such as from about 20 to about 45 or from about 30 to about 40. The term "short-chain" refers, for example, to hydrocarbon chains in which n represents the number of carbon atoms in the chain and wherein n is a number of from 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively, a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and i is $\sqrt{-1}$. Alternatively a viscometer that can measure only the transient measurement of, for instance, a capillary or shear viscosity, such as those made by Brookfield Engineering Laboratories or Cannon Instrument Company can also be used.

"Optional" or "optionally" refer, for example, to instances in which the subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Exemplary ink compositions provide superior print quality while meeting requirements of piezoelectric ink jet printing processes. An exemplary ink composition includes an ink vehicle and a crystalline polyester resin. In particular, exemplary ink compositions comprise an ink vehicle that includes a curable monomer, a gellant, and a crystalline polyester. Additional exemplary ink compositions comprise an ink vehicle that comprises two or more chemically distinct curable gellants. Exemplary methods of preparing such ink compositions and exemplary methods of using such ink compositions are also described.

In embodiments, the curable phase change ink is a gel at room temperature, or the gel can be realized as the ink composition cools after being jetted onto the substrate at the jetting temperature. The curable phase change ink may also be a solid at room temperature.

When the ink compositions described herein are in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s, at a gelling temperature. The gelling temperature may be from about from about 20° C. to about 85° C., such as from about 25° C. to about 80° C., from about 25° C. to about 70° C., from about 25° C. to about 65° C., or from about 25° C. to about 35° C., such as about 30° C. Gel-phase viscosity of embodiments can vary with the print process. For example, the highest viscosities may be suitable for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink formulation and substrate temperature.

The curable phase change ink to have a viscosity of less than about 15 mPa·s, such as less than about 12 mPa·s, for example from about 3 to about 12 mPa·s, such as from about 5 to about 10 mPa·s, at the temperature of jetting. The ink compositions may be jetted at temperatures of less than about 110° C., such as from about 40° C. to about 100° C., from about 55° C. to about 100° C., from about 60° C. to about 100° C., from about 70° C. to about 100° C. and from about 70° C. to about 90° C. Furthermore, the curable phase change ink may have an elastic modulus (G') of from about 3000 Pa to about 4000 Pa, from about 3100 Pa to about 3500 Pa and from about 3100 Pa to about 3300 Pa.

Crystalline Polyester Resin

In embodiments, the curable phase change ink includes a crystalline polyester resin. As used herein, "crystalline" refers to a polyester with a three dimensional order. "Semicrystalline resins" as used herein refer to resins with a crystalline percentage of, for example, from about 10 to about 99%, and more specifically from about 10 to about 50%. Further, as used hereinafter "crystalline polyester resins" and "crystalline resins" encompass both crystalline resins and semicrystalline resins, unless otherwise specified.

The crystalline polyester resins, which are available from a number of sources, possess various melting points of, for example, from about 30° C. to about 120° C., such as from about 50° C. to about 90° C. The crystalline resin may have, for example, a number average molecular weight ($M_n$), as measured by gel permeation chromatography (GPC) of, for example, from about 5,000 to about 12,000 Daltons (Da), from about 5,000 to about 11,000 Da, from about 6,000 to about 11,000 Da and from about 9,000 to about 11,000 Da. The weight average molecular weight ($M_w$) of the resin may be, for example, from about 10,000 to about 60,000 Da, from about 15,000 to about 50,000 Da, from about 15,000 to about 30,000 Da and from about 20,000 to about 22,000 Da, as determined by GPC using polystyrene standards. The molecular weight distribution ($M_w/M_n$) or polydispersity of the crystalline resin is, for example, from about 2 to about 5, from about 2 to about 4, from about 2 to about 3, from about 2 to about 2.5 and from about 2 to about 2.2.

The polyester crystalline polyester resins can be prepared by a polycondensation process by reacting at least one organic diol and at least one organic diacid in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of the organic diacid, an organic diester can also be selected, and where an alcohol byproduct is generated.

Examples of organic diols include aliphatic diols with from about 2 to about 36 carbon atoms, such as 2,2-dimethyl-1,3-propanediol, cyclohexanediol, triethylene glycol, dimer diol, benzenedimethanol, cyclohexanedimethanol, 2,2-dibutyl-1, 3-propanediol, 2,8-bis(hydroxymethyl) tricycle [5.2.1.0$^{2,6}$] decane, 1,16-hexadecanediol and 2-phenyl-1,3-propanediol, tetrafluoro-1,4-butanediol, diethylene glycol, ethylene glycol, propylene glycol, 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, dodecanedioic acid, fumaric acid, isophthalic acid, terephthalic acid, oxaloacetic acid, dimer diacid, malonic acid, tetrafluorosuccinic acid, methyl malonic acid, thiodiacetic acid, diglycolic acid, maleic acid, oxaloacetic acid, acetoxyacetic acid, cyclopropane-1,1-dicarboxylic acid, glutaconic acid, itaconic acid, 1,3-acetonedicarboxylic acid, ketoglutaric acid, dimethylmalonic acid, methylsuccinic acid, glutaric acid, muconic acid, cyclobutane-1,1-dicarboxylic acid, 2-oxoadipic acid, 2,2-dimethylsuccinic acid, methylglutaric acid, 3,3'-thiodipropionic acid, 4-oxoheptanedioic acid, dimethylglutaric acid, cyclohexane-1,1-dicarboxylic acid, 5-oxoazelaic acid, phenylenediacetic acid, indan-2,2-dicarboxylic acid, tetradecanedioic acid, hexadecanedioic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophtalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-aminoethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

The molecular weight of the crystalline polyester can be controlled during the synthesis by the inclusion of monofunctional acids such as cyclohexanecarboxylic acid, 3-(tert-Butoxy)propionic acid, 2,2-Dimethylbutyric acid, hexanoic acid, stearic acid, octanoic acid or monofunctional alcohols, such methyl cyclohexanol, hexanol, heptanol, octanol, 3,3-diethoxy-1-propanol, methylbenzyl alcohol, methoxyphenylethyl alcohol, dodecanol.

Illustrative examples of crystalline polyester resins may include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), polypropylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfoisophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfo-isophthaloyl)-copoly(propylene-succinate), copoly(5-sulfo-isophthaloyl)-copoly(butylene-succinate), copoly(5-sulfo-isophthaloyl)-copoly(pentylene-succinate), copoly(5-sulfoisophthaloyl)-copoly(hexylene-succinate), copoly(5-sulfo-isophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

Suitable crystalline polyester resins also include those disclosed in U.S. Pat. No. 7,329,476 and U.S. Patent Application Pub. Nos. 2006/0216626, 2008/0107990, 2008/0236446 and 2009/0047593, each of which is hereby incorporated by reference in their entirety. In embodiments, a suitable crystalline resin may include a resin composed of ethylene glycol and a mixture of dodecanedioic acid and fumaric acid co-monomers with the following formula:

(I)

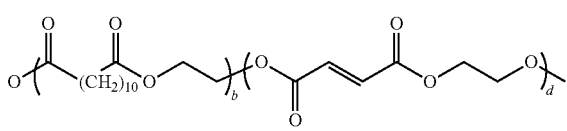

wherein b is from 5 to 2000 and d is from 5 to 2000.

If semicrystalline polyester resins are employed, the semi-crystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The crystalline polyester may be present in the curable phase change ink composition in an amount of from about 0.1 weight percent to about 15 weight percent, from about 1 weight percent to about 10 weight percent, from about 1 weight percent to about 7.5 weight percent, from about 1 weight percent to about 5 weight percent from about 1.5 weight percent to about 4 weight percent and from about 2 weight percent to about 3.5 weight percent of the curable phase change ink.

Upon jetting or printing the curable phase change at a jetting temperature less than 110° C., the amount of crystalline polyester resin in the curable phase change ink composition is from 1 to about 5 weight percent. However, if the curable phase change ink composition is jetted at a temperature greater than 110° C., an additional amount of crystalline polyester resin may be added.

Curable Monomers

In embodiments, the curable phase change ink includes an ink vehicle comprised of at least a gellant, at least a curable wax, an optional photoinitiator, an optional colorant, and at least a curable monomer. In embodiments, if more than one curable liquid monomer is present in the curable phase change ink, the curable liquid monomers are referred to "co-monomers". The co-monomers may be chosen from any suitable curable monomers.

Ink compositions of embodiments may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the at least one curable monomer of the composition include propoxylated neopentyl glycol diacrylate (such as SR-9003 from Sartomer), diethylene glycol diacrylate, triethylene glycol diacrylate, butanediol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl(meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, tricyclodecane dimethanol diacrylate, dioxane glycol diacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR399LV and SR 494), and the like.

Additional examples of the curable monomers include acrylated esters, acrylated polyesters, acrylated ethers, acrylated polyethers, acrylated epoxies, urethane acrylates, and pentaerythritol tetraacrylate. Specific examples of suitable acrylated oligomers include, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like; acrylated urethane oligomers, such as EB270 (UCB Chemicals), EB 5129 (Cytec Surface Specialties), CN2920 (Sartomer Co.), CN3211 (Sartomer Co.), and the like; and acrylated epoxy oligomers, such as EB 600 (Cytec Surface Specialties), EB 3411 (Cytec Surface Specialties), CN2204 (Sartomer Co.), CN110 (Sartomer Co.), and the like.

In embodiments, the curable monomer may be chosen from short-chain alkyl glycol diacrylates or ether diacrylates or from acrylates having short-chain alkyl ester substituents, such as caprolactone acrylate, and the commercially available products CD536, CD 2777, CD585 and CD586 (available from Sartomer Co. Inc.).

In addition, the curable monomer or oligomer may variously function as a viscosity reducer, as a binder when the composition is cured, as an adhesion promoter, as a reactive diluent and as a crosslinking agent that can increase the crosslink density of the cured image, thereby enhancing the toughness of the cured images. Suitable monomers may have a low molecular weight, low viscosity, and low surface tension and comprise functional groups that undergo polymerization upon exposure to radiation such as UV light.

The curable phase change ink compositions of embodiments may include one or more co-monomers in an amount ranging from about 5% to about 80% by weight, such as from about 20% to about 70% by weight, or from about 30% to about 60% by weight, relative to the total weight of the ink vehicle.

Curable Gellants

The curable phase change ink composition may include at least one gellant.

The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase change transition.

The phase change nature of the gellant can thus be used to cause a rapid viscosity increase in the jetted ink composition upon the substrate following jetting of the ink to the substrate. In particular, jetted ink droplets would be pinned into position on a receiving substrate, such as an image-receiving medium (for instance, paper), that is at a temperature cooler than the ink jetting temperature of the ink composition through the action of a phase change transition in which the ink composition undergoes a significant viscosity change from a liquid state to a gel state (or semi-solid state).

In embodiments, the temperature at which the ink composition forms the gel state is any temperature below the jetting temperature of the ink composition, for example any temperature that is about 10° C. or more below the jetting temperature of the ink composition. There is a rapid and large increase in ink viscosity upon cooling from the jetting temperature at which the ink composition is in a liquid state, to the gel transition temperature, at which the ink composition converts to the gel state.

A suitable gellant for the ink composition would gel the monomers/oligomers in the ink vehicle quickly and reversibly, and demonstrate a narrow phase change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. patent application Ser. No. 12/474,946, which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference.

As described in U.S. Pat. No. 7,279,587, the amide gellant may be a compound of the formula

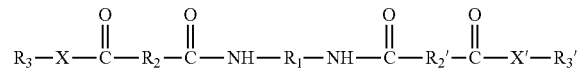

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms, (ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or (iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

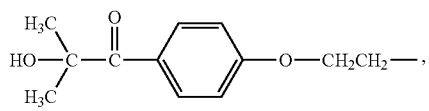

groups derived from 1-hydroxycyclohexylphenylketone, of the formula

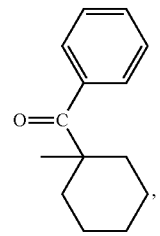

groups derived from 2-hydroxy-2-methyl-1-phenylpropan-1-one, of the formula

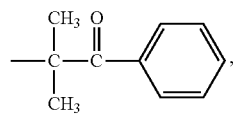

groups derived from N,N-dimethylethanolamine or N,N-dimethylethylenediamine, of the formula

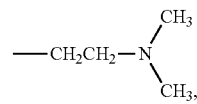

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

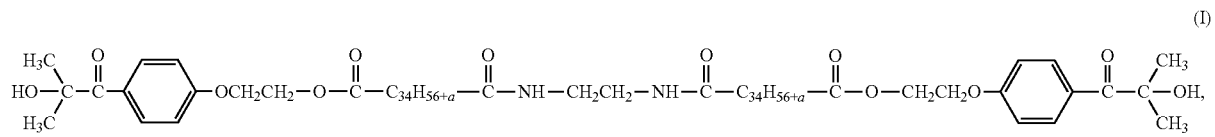

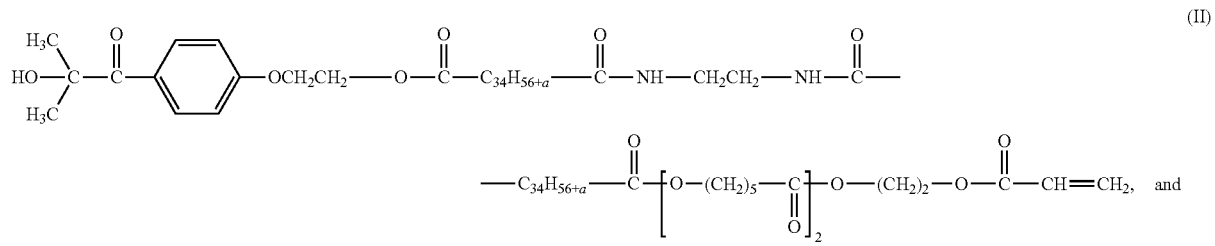

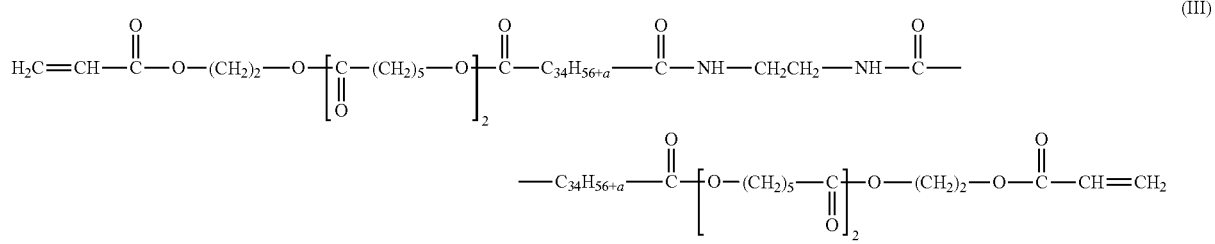

wherein —C$_{34}$H$_{56+a}$— represents a branched alkylene group which may include unsaturations and cyclic groups, wherein the variable "a" is an integer from 0-12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like), or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

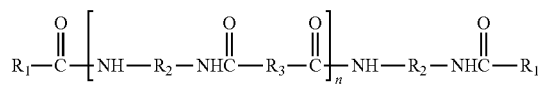

wherein R$_1$ is an alkyl group having at least seventeen carbons, R$_2$ includes a polyalkyleneoxide, R$_3$ includes a C-6 carbocyclic group, and n is an integer of at least 1, such as from 1 to about 100, from about 1 to about 50 and from about 5 to about 25.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are curable via free-radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as about 1% to about 50% by weight of the composition. In embodiments, the gellant may be present in an amount of about 2% to about 20% by weight of the composition, such as about 3% to about 10% by weight of the composition.

The ink composition may include at least one curable wax. The wax may be a solid at room temperature (25° C.). Inclusion of the wax may promote an increase in viscosity of the ink composition as the composition cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above curable monomer(s).

Suitable examples of hydroxyl-terminated polyethylene waxes that may be functionalized with a curable group include, but are not limited to, mixtures of carbon chains with the structure CH$_3$—(CH$_2$)$_n$—CH$_2$OH, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with M$_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

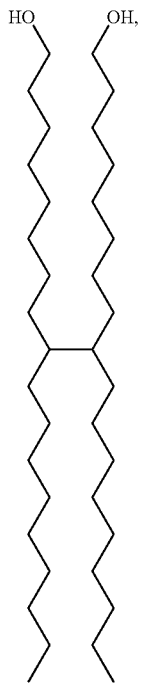 [SMILES: CCCCCCCCCC(CCCCCCCCO)C(CCCCCCCCC)CCCCCCCCO]

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

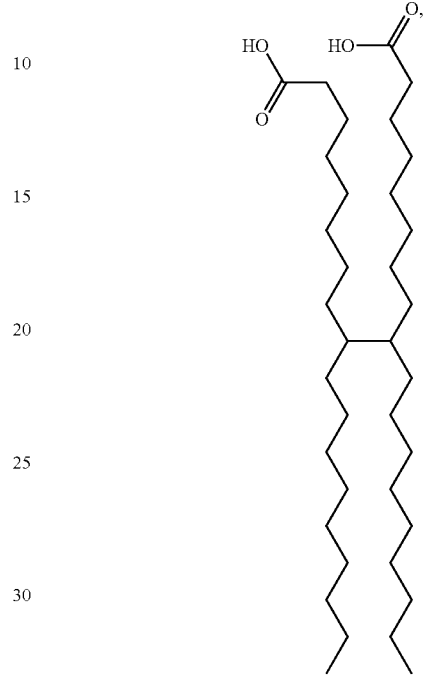

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

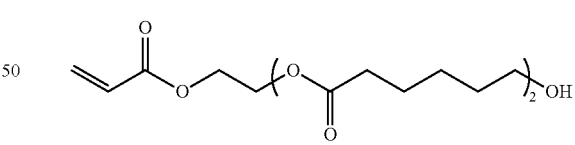

SR495B from Sartomer Company, Inc.;

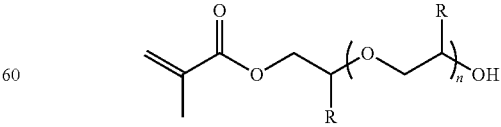

CD572 (R═H, n=10) and SR604 (R═Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

Optional Additives

The ink vehicles of embodiments may be mixtures of curable components and, optionally, additional materials including additional curable monomers, colorants, initiating agents, antioxidants, as well as any conventional optional additives. Such conventional additives may include, for example, defoamers, slip and leveling agents, surfactants, pigment dispersants and the like. The inks may also include additional monomeric or polymeric materials as desired.

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, the disclosures of each of which are incorporated herein by reference in their entirety.

The colorant may be included in the ink composition in an amount of from, for example, about 0.1 to about 15% by weight of the ink composition, such as about 2.0 to about 9% by weight of the ink composition.

Initiators

The curable phase change ink composition may optionally include an initiator, such as, for example, a photoinitiator. In embodiments, such an initiator is desirable for assisting in curing of the ink.

In embodiments, a photoinitiator that absorbs radiation, for example UV light radiation, to initiate curing of the curable components of the ink may be used. As the photoinitiator for ink compositions of embodiments that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-hydroxketones, α-alkoxyketones, α-aminoketones, α-alkoxyalkylphenones, α-aminoalkylphenones and acylphosphine photoinitiators sold under the trade designations of IRGACURE and DAROCUR from Ciba. Specific examples of suitable photoinitiators include 2,4,6-trimethyl-benzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Antioxidants

The curable phase change ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn A G, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

Ink Composition Preparation and Use

The curable phase change inks of embodiments may be prepared by any suitable technique. As an example, the inks may be prepared by first combining the initiator components with the curable monomer and optional oligomers mixture, adding the specified amount of gellant, which may be less than 50% by weight or less than 15% by weight of the ink composition, optionally adding the specified amount of reactive wax which may be less than 50% by weight or less than 10% by weight, heating the mixture to obtain a single phase with low viscosity and thereafter adding this hot mixture slowly to a heated pigment dispersion (which may be a concentrate) while agitating the mixture. The ink composition may then be filtered, optionally at an elevated temperature, through a filter to remove extraneous particles. The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

The ink compositions may be employed in an apparatus for direct printing ink-jet processes, wherein when droplets of the melted ink are ejected in an imagewise pattern onto a recording substrate, the recording substrate is a final recording substrate. The recording substrate may be at any suitable temperature during recording. In embodiments, the recording substrate may be at room temperature. However, in some embodiments, the substrate may be heated or cooled to have a surface temperature that is, for example, within the range of gel-phase transition temperatures for the ink composition. For example, the substrate may be maintained at a temperature of about 5° C. to about 160° C., such as from about 15° C. to about 50° C., or from about 20° C. to about 40° C. In this way, the jetted ink may be made to rapidly form a gel. Thus, the ink may be heated to a first temperature at which the ink may be jetted, for instance, above the gel-transition temperature of the ink composition, which first temperature may be, for example, from about 50° C. to about 100° C. The second temperature at which the gel forms is less than the first temperature, for example is from about 5° C. to about 75° C., as discussed above.

The ink compositions can also be employed in indirect (offset) printing ink jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions may be jetted onto an intermediate-transfer substrate, for instance, an intermediate-transfuse drum or belt. In a suitable design, the image may be applied by jetting appropriately colored ink compositions during, for instance, four to eighteen rotations (incremental movements) of the intermediate-transfuse member with respect to the ink jet head, in other words, there is a small translation of the printhead with respect to the substrate in between each rotation. This approach simplifies the printhead design, and the small movements ensure good droplet registration. Transfuse, or a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, such as the transfuse member. This allows the image to be rapidly built onto the transfuse member for subsequent transfer and fusing to an image-receiving substrate. Alternatively, the same image build-up can be carried out directly on the image substrate, for example, paper.

The intermediate-transfer member may take any suitable form, such as a drum or belt. The member surface may be at room temperature, although in embodiments the member may be heated to have a surface temperature that is, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a first temperature at which the ink may be jetted, for instance, above the gel-transition temperature of the ink composition, which first temperature may be, for example, from about 40° C. to about 100° C. The second temperature at which the gel forms is less than the first temperature, for example is from about 25° C. to about 100° C., as discussed above.

Once upon the intermediate-transfer member surface, the jetted ink composition may be exposed to radiation to a limited extent so as to affect a limited curing of the ink upon the intermediate-transfer member surface. This intermediate curing is not to cure the ink composition to its full extent, but merely to assist in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to co-pending U.S. Patent Application Publication Nos. 2006/0158496 and 2006/0119686, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is thereafter transferred to an image receiving substrate. The substrate may be any suitable material such as non-porous flexible food packaging substrates, adhesives for food packaging paper, foil-laminating, fabric, plastic, glass, metal, etc.

Following transfer to the substrate or jetting to the substrate if direct printing is employed, an image may then be contacted with a rotating contact member, which may or may not comprise a release layer in the form of an oil or aqueous solution as disclosed in Xerox Docket No. 20090780-US-NP and related applications in order to achieve leveling of the image. The ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies. The energy source used to initiate crosslinking of the curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary. The curable components of the ink composition react to form a cured or cross-linked network of appropriate hardness and robustness. In embodiments, the curing is substantially complete to complete, at least 75% of the curable components are cured (reacted and/or cross-linked). This allows the ink composition to be substantially hardened, and thereby to be much more scratch resistant, and also adequately controls the amount of show-through on the substrate.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Optionally, a layer of a sacrificial liquid can be applied to the intermediate-transfer member prior to ejecting the droplets of melted ink onto the intermediate-transfer member, whereby the melted ink droplets are ejected onto the sacrificial liquid layer on the intermediate-transfer member, as disclosed in, for example, U.S. Pat. No. 5,389,958. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink composition is transferred to the final recording substrate in a semi-solid state, facilitating penetration of the ink composition into the final substrate (paper fibers, for example) and enabling improved adhesion, reduced show-through, and reduced pile height.

The following examples of curable phase change ink compositions further illustrate the foregoing embodiments. These Examples are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Ten different ink formulations were prepared as described below in Table 1 and Table 2. Inks A-J were each prepared on a 20 gram scale by combining all components, except the pigment dispersion, and mixing these components at 90° C. and 200 rpm for approximately 1 hour. After 1 hour, the pigment dispersion was added to each ink and combined ink composition was stirred at 90° C. for an additional hour. All inks were fully miscible, giving solutions with a pourable viscosity at elevated temperatures and forming stiff gels when cooled to room temperature. Furthermore, of Inks A-B and D-E each contain "Crystalline Polyester Resin #1", wherein the characteristics of this crystalline polyester resin being a $M_W$ of 22,000 Da, a $M_N$ of 10.2 and a polydispersity of 2.2. Additionally, Inks F-G and I-J each contain "Crystalline Polyester Resin #2", wherein the characteristics of this crystalline polyester resin being a $M_N$ of 21,300 Da, a $M_N$ of 10,200 Da and a polydispersity of 2.2. As used herein in the Examples, the crystalline polyester resins are named using source based polymer nomenclature. For example, "Crystalline Polyester Resin #1" is poly(dodecanedoic acid-alt-1,9-nonanediol)ester (also referred to as poly(nonylene-dodecanedioate) and "Crystalline Polyester Resin #2" is poly(dodecanedoic acid-alt-(1,9-nonanediol)$_{0.475}$(neopentyl glycol)$_{0.025}$)ester.

TABLE 1

Components of Inks A-E

| | Inks | | | | |
|---|---|---|---|---|---|
| Component | A wt % | B wt % | C wt % | D wt % | E wt % |
| Amide Gellant | 7.5% | 7.5% | 7.5% | 7.5% | 7.5% |
| Unilin 350-acrylate | 5% | 5% | 5% | 5% | 5% |
| Irgacure 127 | 3.5% | 3.5% | 3.5% | 3.5% | 3.5% |
| Irgacure 819 | 2% | 2% | 2% | 2% | 2% |
| Irgacure 379 | 3% | 3% | 3% | 3% | 3% |
| Irgastab UV 10 | 0.2% | 0.2% | 0.2% | 0.2% | 0.2% |
| Pigment | 20% | 20% | 20% | 20% | 20% |
| Crystalline Polyester Resin #1 | 2.5% | 5% | 0% | 10% | 15% |
| SR 9003 | 56.3% | 53.8% | 58.8% | 48.8% | 43.8% |
| Total | 100% | 100% | 100% | 100% | 100% |

TABLE 2

Components of Ink F-J

| | Inks | | | | |
|---|---|---|---|---|---|
| Component | F wt % | G wt % | H wt % | I wt % | J wt % |
| Amide Gellant | 7.5% | 7.5% | 7.5% | 7.5% | 7.5% |
| Unilin 350-acrylate | 5% | 5% | 5% | 5% | 5% |
| Irgacure 127 | 3.5% | 3.5% | 3.5% | 3.5% | 3.5% |
| Irgacure 819 | 2% | 2% | 2% | 2% | 2% |
| Irgacure 379 | 3% | 3% | 3% | 3% | 3% |
| Irgastab UV 10 | 0.2% | 0.2% | 0.2% | 0.2% | 0.2% |
| Pigment | 20% | 20% | 20% | 20% | 20% |
| Crystalline Polyester Resin #2 | 2.5% | 5% | 0% | 10% | 15% |
| SR 9003 | 56.3% | 53.8% | 58.8% | 48.8% | 43.8% |
| Total | 100% | 100% | 100% | 100% | 100% |

Viscosity and Elastic Modulus

The temperature dependant dynamic viscosity of Example Inks A-B and F-G was evaluated using an RFS III controlled strain rheometer, manufactured from TA Instruments equipped with a 50 mm parallel plate.

TABLE 3

Viscosity of Inks A-J

| | Amount of | | Complex Viscosity (cps) | | |
|---|---|---|---|---|---|
| Type of Crystalline Polyester | Crystalline Polyester (wt. %) | Ink | Jetting Temp. 90° C. | Jetting Temp. 85° C. | Jetting Temp. 80° C. |
| Crystalline Polyester 1 | 2.5 | A | 6.10 | 7.05 | 8.27 |
| | 5 | B | 8.30 | 9.70 | 11.44 |
| | 0 | C | 4.76 | 5.46 | 6.34 |
| | 10 | D | 35.86 | 39.47 | 46.21 |
| | 15 | E | 109.56 | 105.35 | 117.15 |
| Crystalline Polyester 2 | 2.5 | F | 9.48 | 10.76 | 12.46 |
| | 5 | G | 9.28 | 10.74 | 12.55 |
| | 0 | H | 6.54 | 7.37 | 8.27 |
| | 10 | I | 39.54 | 42.05 | 49.23 |
| | 15 | J | 124.84 | 113.24 | 123.70 |

As shown above in Table 3, curable phase change ink compositions containing a crystalline polyester resin in an amount of 2.5 weight percent (Ink A or Ink F) to 5.0 weight percent (Ink B or Ink G), of the curable phase change ink composition have a jettable viscosity less than about 13 cP at a target jetting temperature range of 80° C. to 90° C.

TABLE 4

Elastic Modulus of Inks A-J

| | Amount of | | Elastic Modulus (cps) | | |
|---|---|---|---|---|---|
| Type of Crystalline Polyester | Crystalline Polyester (wt. %) | Ink | 40° C. | 35° C. | 30° C. |
| Crystalline Polyester 1 | 2.5 | A | 1195.75 | 2448.47 | 4224.11 |
| | 5 | B | 769.47 | 1530.25 | 2586.96 |
| | 0 | C | 565.38 | 1224.13 | 2179.90 |
| | 10 | D | 922.69 | 1727.61 | 8353.68 |
| | 15 | E | 5717.99 | 11880.14 | 32666.63 |

TABLE 4-continued

Elastic Modulus of Inks A-J

| Type of Crystalline Polyester | Amount of Crystalline Polyester (wt. %) | Ink | Elastic Modulus (cps) | | |
|---|---|---|---|---|---|
| | | | 40° C. | 35° C. | 30° C. |
| Crystalline Polyester 2 | 2.5 | F | 964.64 | 1900.80 | 3258.49 |
| | 5 | G | 909.05 | 1760.71 | 2890.71 |
| | 0 | H | 565.38 | 1224.13 | 2179.90 |
| | 10 | I | 1086.98 | 1912.26 | 3114.25 |
| | 15 | J | 1603.47 | 3368.89 | 19224.36 |

As shown above in Table 4, the elastic modulus increases with increasing weight % of either crystalline polyester resin. A high elastic modulus is indicative of greater cohesion which will result in less ink splitting or offset during contact leveling or transfer from an intermediate member.

Contact Leveling Analysis

Ink A and Ink F were loaded into a printhead and jetted onto transparencies using a modified Phaser printer. The printed squares were then fed through a contact leveling roller and followed with a chase sheet at a surface speed of 100 ips. The offset leveling surface was 25% Polyhedral oligomeric silsesquioxane (POSS) in viton.

The degree of offset to the contact leveling surface was determined by measuring a lightness parameter L* of the image transferred from the contact leveling surface to the chase sheet. The lightness parameter L* was measured using a handheld X-Rite 938 spectrodensitometer manufactured by the X-Rite Corporation. A high L* value, such as greater than about 85 is desired, as it indicates very little offset or transfer of the ink from the contact roller. However, a low L* value, such as less than about 80 is undesirable, as indicates significant offset of the ink to the contact leveling roller.

The L* values of the first chase sheet printed with Ink A and Ink F, and the two comparative inks, Comparative Ink A and Comparative Ink B, are shown below in Table 4. Comparative inks A and B were prepared in exact same manner using the exact same materials as Inks A and F, except that Comparative Ink A and Comparative Ink B did not contain any crystalline polyester resin. Furthermore, L* values were then compared to the target value (no offset) as the baseline value for paper alone, as shown below in Table 4.

TABLE 5

L* Values Of Ink A, Ink F And Comparative Inks A-B

| Ink | L* |
|---|---|
| Ink A | 90.2 |
| Ink F | 89.5 |
| Comparative Ink A | 80 |
| Comparative Ink B | 84 |
| Paper (Target Value) | 94.5 |

As shown above in Table 5, the L* of the chase sheet increased for Ink A and Ink F as compared to the inks of Comparative Inks A-B indicating less ink splitting or offset occurred for the Ink A and Ink F.

Furthermore, the difference between the L* value for the print after leveling and the L* for the first chase sheet (ΔL*) was evaluated for each of the above inks. This value provides an estimate of the affinity of the ink to the contact leveling roll. For example, an ink with a high affinity to the contact leveling roll results in a decreased L* (less dark) value for the print after leveling. These values are illustrated below in Table 6.

TABLE 6

L* Values Of Ink A, Ink F And Comparative Inks A-B

| Ink | ΔL* |
|---|---|
| Ink A | 37 |
| Ink F | 35 |
| Comparative Ink A | 20 |
| Comparative Ink B | 27.5 |

As shown above in Table 6, the ΔL* of the chase sheet increased for Ink A and Ink F as compared to the inks of Comparative Ink A-B indicating that Inks A and F do not have a special affinity for the contact leveling roller.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A curable phase change ink composition, the ink composition comprising at least one curable acrylate or acrylated monomer, at least one gellant, at least one curable wax, at least one UV absorbing photoinitiator, and at least one crystalline polyester, wherein the at least one crystalline polyester has a weight average molecular weight ($M_w$) of from 21,300 Dalton (Da) to 22,000 Da and wherein the at least one crystalline polyester comprises from 1-5% by weight of the ink composition.

2. The curable phase change ink composition of claim 1, wherein the at least one crystalline polyester has a number average molecular weight ($M_n$) of from 9,000 Da to 11,000 Da and a polydispersity of from 2.0 to 2.2.

3. The curable phase change ink composition of claim 1, wherein the at least one crystalline polyester is formed by reacting at least one organic diol with at least one organic diacid, the organic diol being selected from the group consisting of ethylene glycol, propylene glycol, tetrafluoro-1,4-butanediol, diethylene glycol, 2,2-dimethyl-1,3-propanediol, cyclohexanediol, 1,4-butanediol, 1,5-pentanediol, 1,6-hexanediol, triethylene glycol, dimer diol, 1,7-heptanediol, benzenedimethanol, cyclohexanedimethanol, 2,2-dibutyl-1,3-propanediol, 2,8-bis(hydroxymethyl) tricycle [$5.2.1.0^{2,6}$]decane, 1,16-hexadecanediol and 2-phenyl-1,3-propanediol, and the organic diacid being selected from the group consisting of adipic acid, succinic acid, sebacic acid, dodecanedioic acid, fumaric acid, isophthalic acid, terephthalic acid, oxaloacetic acid, dimer diacid, oxalic acid, malonic acid, tetrafluorosuccinic acid, methyl malonic acid, thiodiacetic acid, diglycolic acid, maleic acid, oxaloacetic acid, acetoxyacetic acid, cyclopropane-1,1-dicarboxylic acid, glutaconic acid, itaconic acid, 1,3-acetonedicarboxylic acid, ketoglutaric acid, dimethylmalonic acid, methylsuccinic acid, glutaric acid, muconic acid, cyclobutane-1,1-dicarboxylic acid, 2-oxoadipic acid, 2,2-dimethylsuccinic acid, methylglutaric acid, 3,3'-thiodipropionic acid, 4-oxoheptanedioic acid, dimethylglutaric acid, cyclohexane-1,1-dicarboxylic acid, 5-oxoazelaic acid, phenylenediacetic acid, indan-2,2-dicarboxylic acid, tetradecanedioic acid, and hexadecanedioic acid.

4. The curable phase change ink composition of claim 1, wherein the crystalline polyester comprises a polyester selected from the group consisting of poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

5. The curable phase change ink composition of claim 1, wherein the curable phase change ink composition has a jetting temperature of from about 70° C. to about 100° C.

6. The curable phase change ink composition of claim 1, wherein the curable phase change ink composition has a jetting temperature of from about 60° C. to about 100° C.

7. The curable phase change ink composition of claim 1, wherein the curable phase change ink composition has a gelling temperature of from about 25° C. to about 70° C.

8. The curable phase change ink composition of claim 1, wherein the ink composition has an elastic modulus (G') of from about 3000 Pa to about 4000 Pa, and a viscosity of $10^4$ mPa·s to $10^{6.5}$ mPa·s at a gelling temperature of 25° C. to 35° C., and wherein the ink composition has a viscosity of from 3 to 15 mPa·s at a jetting temperature of from 60° C. to 100° C.

9. The curable phase change ink composition of claim 1, wherein the at least one crystalline polyester is selected from the group consisting of poly(dodecanedoic acid-alt-1,9-nonanediol)ester and poly(dodecanedoic acid-alt-(1,9-nonanediol)$_{0.475}$(neopentyl glycol)$_{0.025}$)ester.

10. The curable phase change ink composition of claim 1, wherein the curable acrylate or acrylated monomer is selected from the group consisting of multifunctional acrylate monomers, acrylated esters, acrylated ethers, acrylated epoxies, and acrylated urethanes.

11. The curable phase change ink composition of claim 1, wherein the at least one curable acrylate or acrylated monomer comprises propoxylated neopentyl glycol diacrylate.

12. An ink printing device comprising: a curable phase change ink composition for printing onto a substrate, an ink jetting device, a contact leveling member or roller, an optional intermediate transfer member, and a curing device which cures the jetted curable ink,
wherein the ink composition comprises at least one curable acrylate or acrylated monomer, at least one amide gellant, at least one curable wax, at least one UV absorbing photoinitiator, and at least one crystalline polyester,
wherein the crystalline polyester has a weight average molecular weight ($M_w$) of from 21,300 Dalton (Da) to 22,000 Da and wherein the at least one crystalline polyester comprises from 1-5% by weight of the ink composition.

13. The curable phase change ink composition of claim 12, wherein the at least one crystalline polyester has a number average molecular weight ($M_n$) of from 9,000 Da to 11,000 Da and a polydispersity of from 2.0 to 2.2.

14. The ink printing device of claim 12, wherein the at least one crystalline polyester is formed by reacting at least one organic diol with at least one organic diacid or organic diester,
the organic diol being selected from the group consisting of ethylene glycol, propylene glycol, tetrafluoro-1,4-butanediol, diethylene glycol, 2,2-dimethyl-1,3-propanediol, cyclohexanediol, 1,4-butanediol, 1,5-pentanediol, 1,6-hexanediol, triethylene glycol, dimer diol, 1,7-heptanediol, benzenedimethanol, cyclohexanedimethanol, 2,2-dibutyl-1,3-propanediol, 2,8-bis(hydroxymethyl) tricycle [5.2.1.0$^{2,6}$]decane, 1,16-hexadecanediol and 2-phenyl-1,3-propanediol, and
the organic diacid being selected from the group consisting of adipic acid, succinic acid, sebacic acid, dodecanedioic acid, fumaric acid, isophthalic acid, terephthalic acid, oxaloacetic acid, dimer diacid, oxalic acid, malonic acid, tetrafluorosuccinic acid, methyl malonic acid, thiodiacetic acid, diglycolic acid, maleic acid, oxaloacetic acid, acetoxyacetic acid, cyclopropane-1,1-dicarboxylic acid, glutaconic acid, itaconic acid, 1,3-acetonedicarboxylic acid, ketoglutaric acid, dimethylmalonic acid, methylsuccinic acid, glutaric acid, muconic acid, cyclobutane-1,1-dicarboxylic acid, 2-oxoadipic acid, 2,2-dimethylsuccinic acid, methylglutaric acid, 3,3'-thiodipropionic acid, 4- oxoheptanedioic acid, dimethylglutaric acid, cyclohexane-1,1-dicarboxylic acid, 5-oxoazelaic acid, phenylenediacetic acid, indan-2,2-dicarboxylic acid, tetradecanedioic acid, and hexadecanedioic acid.

15. The ink printing device of claim 12, wherein the crystalline polyester comprises a polyester selected from the group consisting of poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

16. The curable phase change ink composition of claim 12, wherein the curable phase change ink composition has a jetting temperature of from about 70° C. to about 100° C.

17. The curable phase change ink composition of claim 12, wherein the curable phase change ink composition has a jetting temperature of from about 60° C. to about 100° C.

18. The curable phase change ink composition of claim 12, wherein the curable phase change ink composition has a gelling temperature of from about 25° C. to about 70° C.

19. A curable phase change ink composition, the ink composition comprising at least one curable monomer comprising propoxylated neopentyl glycol diacrylate, at least one gellant, at least one curable wax, at least one UV absorbing photoinitiator, and at least one crystalline polyester selected from the group consisting of poly(dodecanedoic acid-alt-1,9-nonanediol)ester and poly(dodecanedoic acid-alt-(1,9-nonanediol)$_{0.475}$(neopentyl glycol)$_{0.025}$)ester, wherein the at least one crystalline polyester comprises from 1-5% by weight of the ink composition.

20. The curable phase change ink composition of claim 19, wherein the at least one curable wax comprises polyethylene acrylate wax.

* * * * *